US012771219B2

(12) United States Patent
Simonin et al.

(10) Patent No.: US 12,771,219 B2
(45) Date of Patent: Oct. 20, 2026

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR); Bruno Constant, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 168 days.

(21) Appl. No.: 18/809,487

(22) Filed: Aug. 20, 2024

(65) Prior Publication Data

US 2025/0079949 A1 Mar. 6, 2025

(30) Foreign Application Priority Data

Aug. 30, 2023 (FR) .................................. FR2309086

(51) Int. Cl.
*H02K 11/40* (2016.01)

(52) U.S. Cl.
CPC .................................... *H02K 11/40* (2016.01)

(58) Field of Classification Search
CPC ............................... H02K 11/40; H02K 13/10
See application file for complete search history.

(56) References Cited

U.S. PATENT DOCUMENTS

| | | | |
|---|---|---|---|
| 11,486,445 | B2 | 11/2022 | Berruet et al. |
| 2016/0111941 | A1 | 4/2016 | Sturm et al. |
| 2017/0108047 | A1 | 4/2017 | White et al. |
| 2021/0021180 | A1 | 1/2021 | Hubert et al. |
| 2021/0310517 | A1 | 10/2021 | Berruet et al. |
| 2021/0364040 | A1 | 11/2021 | Arnault et al. |

(Continued)

FOREIGN PATENT DOCUMENTS

| | | | |
|---|---|---|---|
| CN | 116598858 | A | 8/2023 |
| DE | 102019207241 | A1 | 11/2020 |
| DE | 102021114965 | A1 | 12/2022 |

(Continued)

OTHER PUBLICATIONS

U.S. Appl. No. 18/809,475, first named inventor: Anthony Simonin, filing date: Aug. 20, 2024.

(Continued)

*Primary Examiner* — Sean Gugger
(74) *Attorney, Agent, or Firm* — J-TEK LAW PLLC; Scott T. Wakeman; Mark A. Ussai

(57) ABSTRACT

A grounding brush assembly includes a grounding brush including a support and a plurality of conductive fibers disposed within the support, and a brush mounting plate which is secured to the support of the brush. The mounting plate includes a radial portion and at least one centering portion extending at least axially from the radial portion, which is offset radially outwardly with respect to the support and has an outer surface defining the outside diameter of the mounting plate. The mounting plate further includes at least one connecting portion connecting the radial portion to the centering portion and provided with at least one oblique part extending obliquely outwardly from the radial portion and on a side opposite to the support.

9 Claims, 5 Drawing Sheets

(56) References Cited

U.S. PATENT DOCUMENTS

| | | | | |
|---|---|---|---|---|
| 2022/0294319 | A1 | 9/2022 | Arnault et al. | |
| 2023/0261555 | A1* | 8/2023 | Arnault | H02K 11/40 310/71 |

FOREIGN PATENT DOCUMENTS

| | | | |
|---|---|---|---|
| FR | 3110650 | A1 | 11/2021 |
| FR | 3120754 | A1 | 9/2022 |
| FR | 3132806 | A1 | 8/2023 |
| KR | 102444892 | B1 | 9/2022 |

OTHER PUBLICATIONS

U.S. Appl. No. 18/809,494, first named inventor: Anthony Simonin, filing date: Aug. 20, 2024.

U.S. Appl. No. 18/809,517, first named inventor: Anthony Simonin, filing date: Aug. 20, 2024.

* cited by examiner

GROUNDING BRUSH ASSEMBLY

CROSS-REFERENCE

This application claims priority to French patent application no. 2309086 filed on Aug. 30, 2023, the contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between the housing of the electric motor or machine and the rotary shaft so as to support the shaft.

In operation, as the shaft rotates, an electrical potential difference can appear between the shaft and the housing of the electric motor or machine that may produce an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is a known practice to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

For further detail regarding the design of such a grounding brush assembly, reference may be made, for example, to US Patent Publication No. 2021/0021180 A1, which describes an assembly comprising a grounding brush provided with a plurality of conductive fibers, a support inside which the conductive fibers are mounted, and an annular mounting plate comprising a plurality of tongues for the radial and axial retention of the support and an annular outer flange radially surrounding the brush and the tongues.

Depending on the relative axial positions of the grounding brush assembly and the bearing, during the operation of the electric machine, there may be contact between the conductive fibers of the assembly on the one hand, and the rolling elements and/or the inner race of the bearing on the other hand. Such contact can damage the bearing or the conductive fibers.

SUMMARY OF THE INVENTION

The present invention aims to remedy the drawback described above and relates to a grounding brush assembly comprising a grounding brush provided with a plurality of conductive fibers and with a support inside which the conductive fibers are mounted. The assembly also comprises a brush mounting plate which is secured to the support of the brush.

The mounting plate includes a radial portion and at least one centering portion extending at least axially from the radial portion, which is offset radially outwardly with respect to the support and has an outer surface defining the outside diameter of the mounting plate.

According to a general feature of the present invention, the mounting plate further includes at least one connecting portion connecting the radial portion to the centering portion and provided with at least one oblique part extending obliquely outwardly from the radial portion and on the side opposite to the support. In other words, the support is disposed on side of the radial portion and the connecting portion extends obliquely outwardly from the other side of the radial portion.

With this design, the risk of contact between the conductive fibers of the assembly and the bearing is limited. To be specific, the connecting portion of the mounting plate makes it possible to keep an axial space between the brush and the bearing or the housing.

In one embodiment, the connecting portion of the mounting plate extends from a large-diameter edge of the radial portion. In this case, the oblique part of the connecting portion may extend from the large-diameter edge of the radial portion.

Alternatively, the connecting portion of the mounting plate may extend from another part of the radial portion.

According to a preferred design, the connecting portion of the mounting plate is provided with a curved part extending from the oblique part and connected to the centering portion. According to another design, the connecting portion of the mounting plate may be provided with a part having a different shape extending from the oblique part and connected to the centering portion, for example, a radial part.

According to yet another design, the oblique part of the connecting portion of the mounting plate may connect directly to the centering portion.

The mounting plate may comprise a plurality of retention tongues for retention of the support of the brush, the retention tongues extending from the radial portion, the centering portion being offset radially outwardly with respect to the retention tongues.

According to one design, the mounting plate may comprise a plurality of centering portions spaced apart from each other in the circumferential direction, and a plurality of connecting portions each connecting a separate one of the centering portions to the radial portion.

According to an alternative design, the mounting plate may comprise an annular centering portion. In this case, the mounting plate may include only a single connecting portion or may include a plurality of connecting portions spaced apart from one another in the circumferential direction.

The brush may be mounted axially against the radial portion of the mounting plate. Alternatively, the brush may be mounted axially against another radial portion of the mounting plate.

The mounting plate may be formed as a single piece, i.e., one-piece construction.

The present invention further relates to an electric motor comprising a housing, a shaft, at least one bearing is mounted radially between the housing and the shaft, and at least one grounding brush assembly as defined hereinabove and mounted radially between the housing and the shaft, the conductive fibers of the brush of the assembly being in contact with the shaft.

BRIEF DESCRIPTION OF THE SEVERAL VIEWS OF THE DRAWINGS

The present invention will be better understood on studying the detailed description of an embodiment, given by way of non-limiting example and illustrated by the appended drawings, in which.

DETAILED DESCRIPTION OF THE INVENTION

Figure 1:
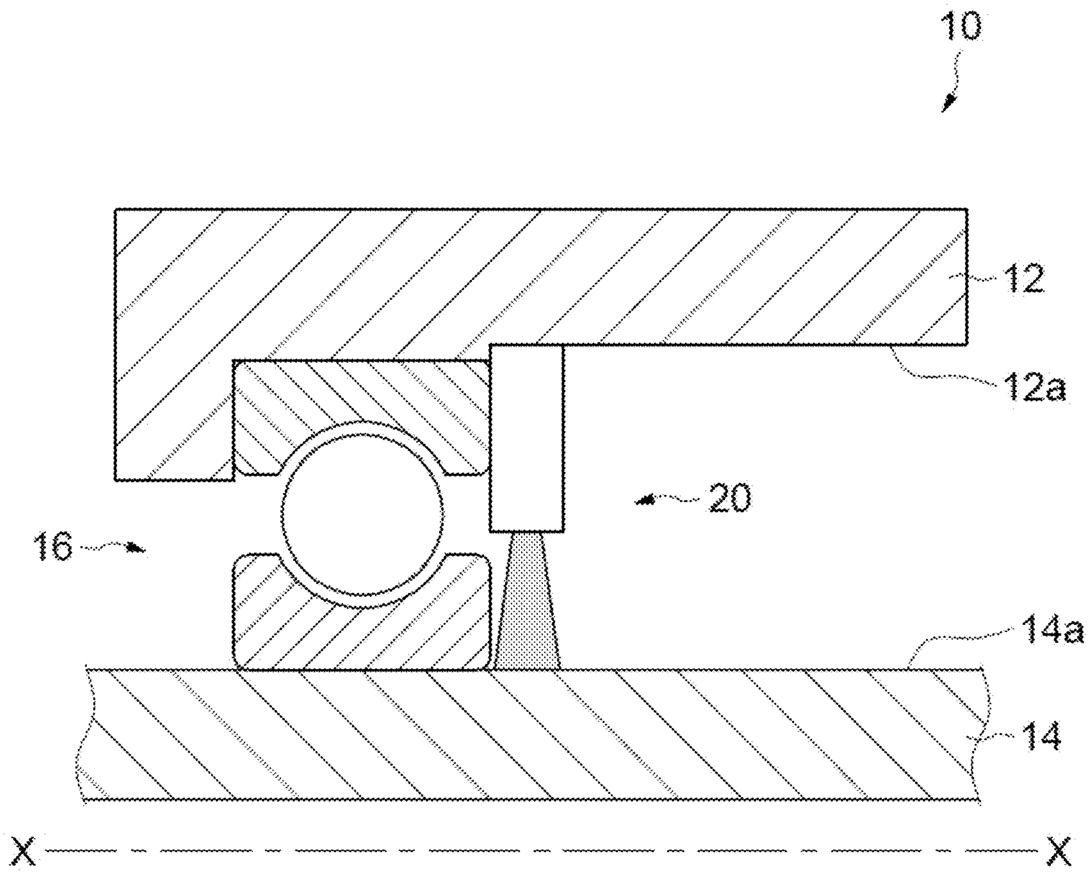
FIG. 1 is a view in axial section of a grounding brush assembly mounted radially between a rotary shaft and a housing of an electric motor.

FIG. 1 shows, in axial section, part of an electric motor 10 or machine comprising a fixed housing 12, a rotary shaft 14, of axis X-X, which is supported radially by a rolling bearing 16. The bearing 16 is mounted radially between the housing 12 and the rotary shaft 14. In the depicted embodiment, the bearing 16 is of the ball bearing type. As an alternative, the bearing 16 may include any other types of rolling elements, such as cylindrical rollers or tapered rollers, or may be formed as a plain journal bearing.

The motor 10 further comprises a grounding brush assembly 20 which is mounted radially between the bore 12*a* of the housing 12 and the outer cylindrical surface 14*a* of the rotary shaft 14. The grounding brush assembly 20 serves to continuously dissipate the electrical charge that builds up on the shaft 14 of the motor 10 when the motor 10 is in operation, by transferring this charge to the housing 12.

A grounding brush assembly 20 according to an exemplary embodiment of the invention will now be described with reference to FIGS. 2-5. The grounding brush assembly 20 has an annular overall shape. The assembly 20 comprises a grounding brush 30 and a brush mounting plate 40 which is configured to radially center the brush 30 about the shaft 14 and within the bore 12*a* of the housing 12.

As will be described in more detail below, the mounting plate 40 is also configured to establish and maintain an axial space between the brush 30 and the bearing 16 or the housing 12.

The brush 30 comprises a plurality of conductive individual fibers 31 which are intended to come around or surround the rotary shaft 14 of the motor 10. The conductive fibers 31 may be made from carbon, stainless steel, conductive plastics, such as fibers made from acrylic or nylon, or any other appropriate conductive material.

The brush 30 further comprises a holding or support member 32, inside which the conductive fibers 31 are mounted; i.e., the fibers 31 are disposed at least partially within the support member 32. In the exemplary embodiment illustrated, the support 32 is in the form of an open ring. The support 32 may be produced by cutting and pressing. The support 32 is preferably made from an electrically conductive material such as aluminum, stainless steel, bronze, copper or another material. Alternatively, the support 32 may be made from an electrically non-conductive material with a conductive coating or a conductive paint applied to the support 32.

Figure 4:
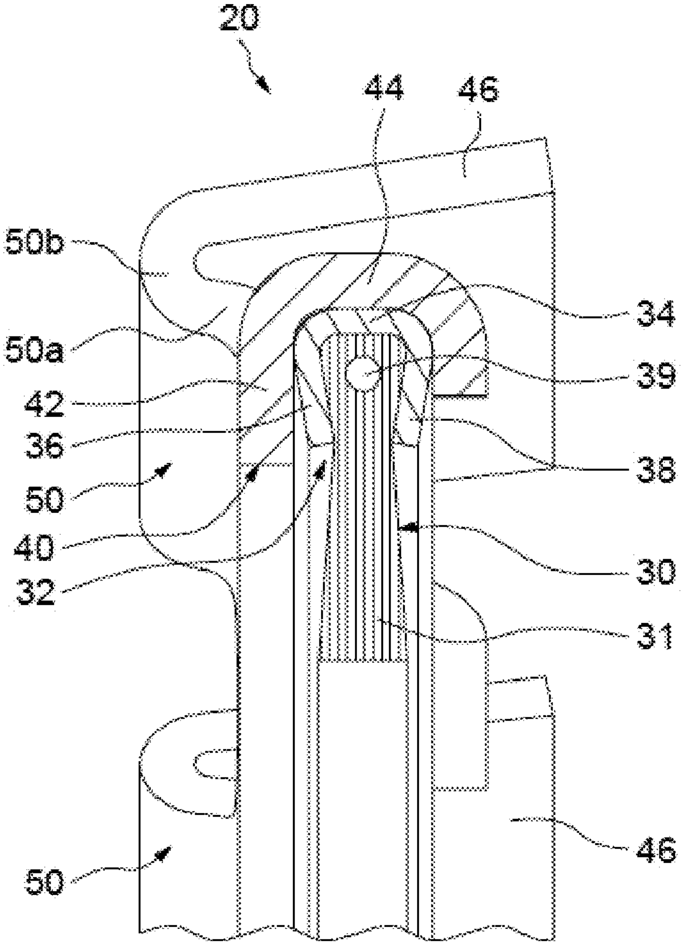
FIG. 4 is a sectional view along line IV-IV of FIG. 3.
Figure 5:
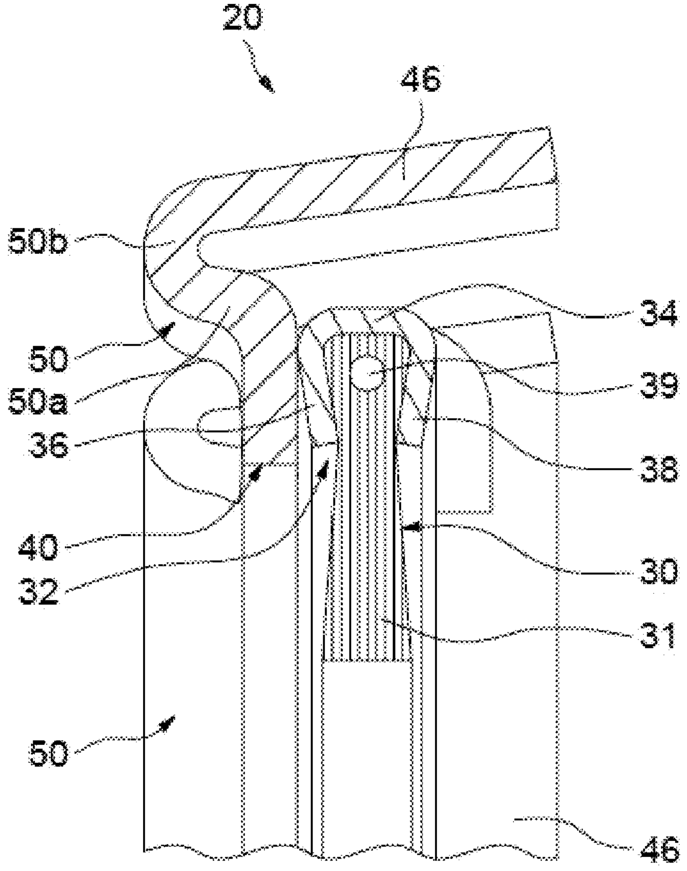
FIG. 5 is a sectional view along line V-V in FIG. 3.

As shown more clearly in FIGS. 4 and 5, the support 32 includes an axial mounting portion 34 and two opposite lateral flanks 36, 38 extending inwardly from the mounting portion 34 and axially gripping the conductive fibers 31. As such, the conductive fibers 31 press axially on each side against the lateral flanks 36, 38; specifically, the conductive fibers 31 press axially on each side against the internal faces of the lateral flanks 36, 38. The mounting portion 34 and the two lateral flanks 36, 38 delimit a channel which is open radially on the inside and inside which the conductive fibers 31 are partially positioned or disposed.

In the depicted example, the conductive fibers 31 are bent around a connecting wire 39 of the support 32. The free distal end of the conductive fibers 31 is intended to come into radial contact with the outer surface of the rotary shaft 14 of the motor 10. The proximal end of the conductive fibers 31 is in radial contact with the mounting portion 34 of the support 32.

The lateral flank 36 extends from one axial end of the mounting portion 34, and the lateral flank 38 extends the opposite axial end of the portion 34. The lateral flanks 36, 38 extend obliquely inwardly from the mounting portion 34. Preferably, the lateral flanks 36, 38 are symmetrical with respect to each other about a radial midplane (not indicated) of the support 32. As depicted, the mounting portion 34 extends axially, but may alternatively extend obliquely.

Figure 2:
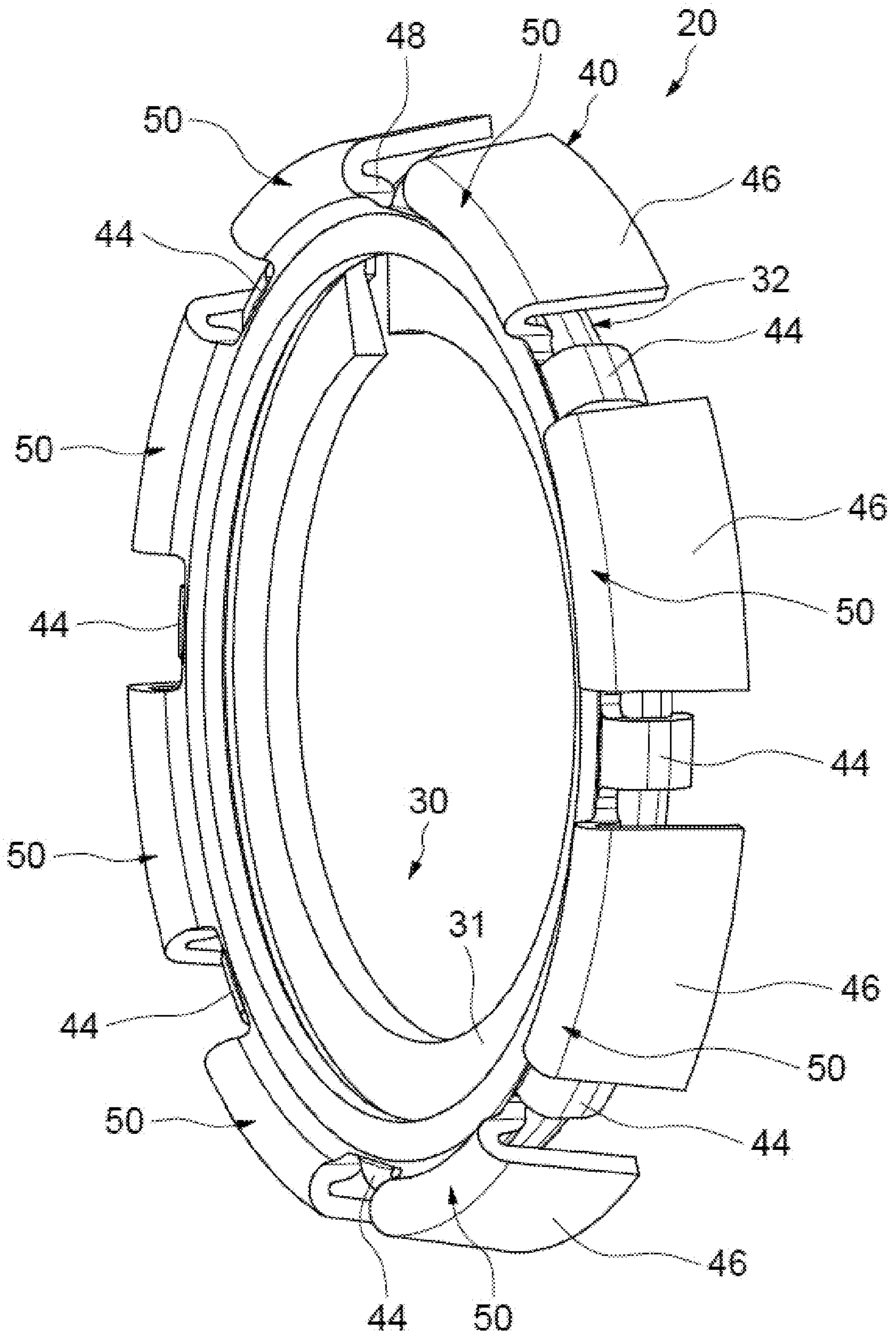
FIG. 2 is a perspective view of a grounding brush assembly according to an exemplary embodiment of the invention.
Figure 3:
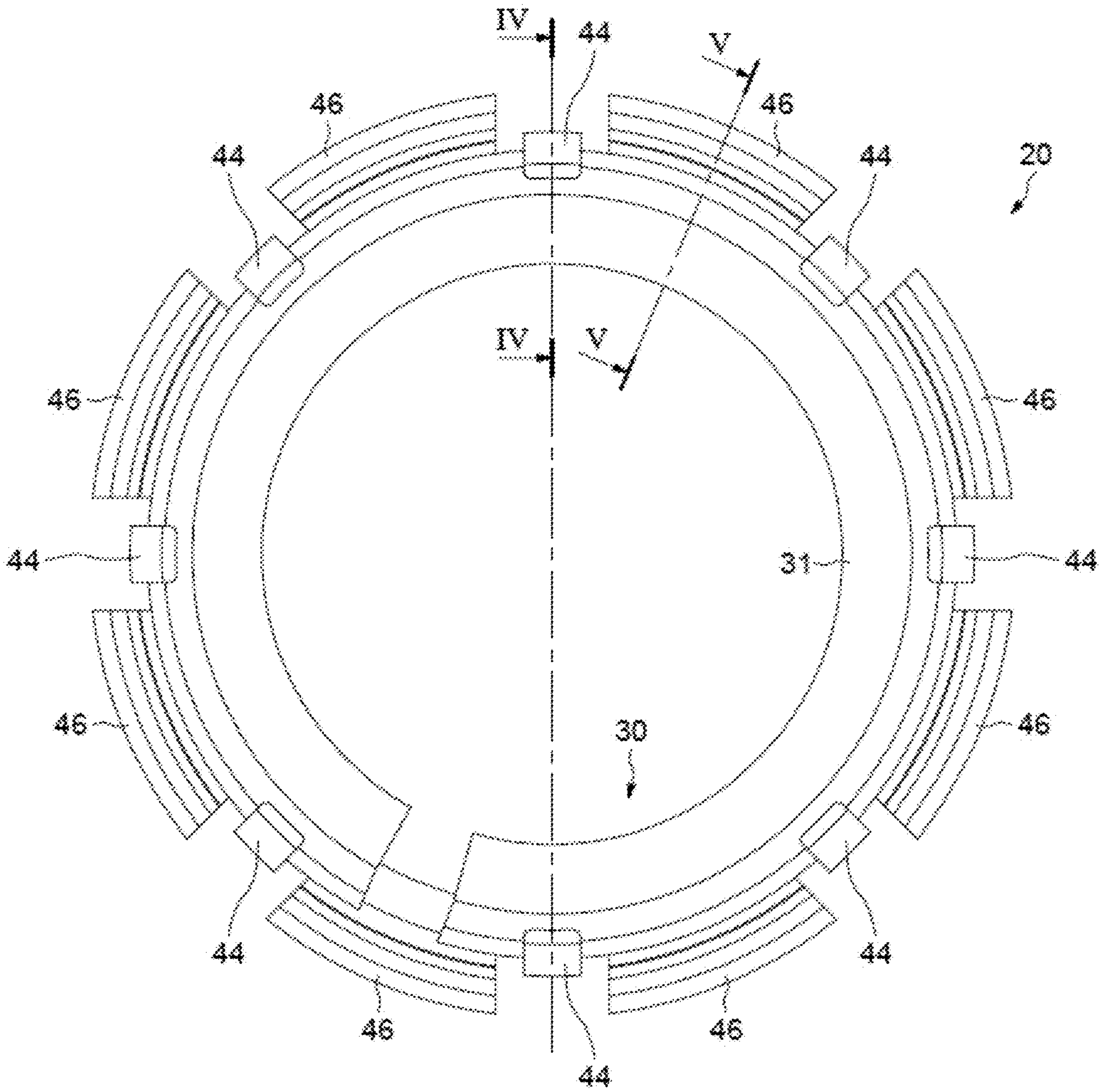
FIG. 3 is a front plan view of the grounding brush assembly of FIG. 2.

As stated above, the brush 30 is in the form of an open ring, as can be seen in particular in FIGS. 2 and 3. This structure allows the brush 30 to adapt to suit or fit about different diameters of motor shaft 14. In general, the circumferential ends of the brush 30 are not joined together. However, as a variant, it is possible to join the two ends of the brush 30 together.

With reference to FIGS. 2, 4 and 5, the mounting plate 40 includes an annular radial portion 42 and a plurality of retention tongues 44 extending from the radial portion 42.

The radial portion 42 of the mounting plate 40 bears axially against the support 32 of the brush 30. More specifically, the radial portion 42 bears axially against the lateral flank 36 of the support 32.

The retention tongues 44 are spaced apart from each other in the circumferential direction, in this instance evenly or regularly. As an alternative, it could be possible to provide an irregular or staggered circumferential spacing. In the depicted exemplary embodiment, there are eight tongues 44. Alternatively, it is possible to provide a greater or smaller number of tongues 44. For example, it is possible to provide two tongues 44 or at least four tongues 44. Preferably, the mounting plate 40 has at least two tongues 44.

Each retention tongue 44 protrudes axially with respect to the radial portion 42. Each tongue 44 locally radially surrounds the support 32 of the brush 30 and is in radial contact with the mounting portion 34 of the support 32. As a result, the support 32 is held axially bearing against the radial portion 42 of the mounting plate by the retention tongues 44. That is, the tongues 44 serve to axially and radially retain the grounding brush 30 to the mounting plate 40. The lateral flank 36 of the support 32 bears against the radial portion 42 of the mounting plate 40, and the lateral flank 38 bears against the tongues 44. The tongues 44 are in this case formed substantially identical to each other.

As shown more clearly in FIG. 4, each retention tongue 44 is provided with an axial portion extending axially from the radial portion 42 of the mounting plate 40, locally radially surrounding the support 32 and in radial contact therewith, and with a bent-over portion at the free end of the axial portion. The bent-over portion 44*b* of each retention tongue 44 functions to axially retain the support 32 of the grounding brush 30. The bent-over portion 44*b* of each retention tongue 44 is in axial contact against the lateral flank 38 of the support 32.

The mounting plate 40 of the grounding brush assembly 20 also includes a plurality of centering tabs 46 and a plurality of connecting portions 50 each connecting one of the centering tabs 46 to the radial portion 42 of the plate 40.

The centering tabs 46 are spaced apart from each other in the circumferential direction. A cutout 48 (FIG. 2) is formed on the radial portion 42 of the mounting plate 40 between each pair of immediately successive tabs 46. The tabs 46 are preferably formed by cutting and bending the radial portion 42 of the plate 40.

Each centering tab 46 axially extends from the associated connecting portion 50. Specifically, the centering tabs 46 extend obliquely from a large-diameter edge of the associated connecting portion 50. The tabs 46 extend axially from the same side of the mounting plate 40 as the tongues 44. The tabs 46 project axially with respect to the tongues 44.

Each centering tab 46 locally radially surrounds the support 32 of the brush 30 while remaining separated therefrom, i.e., radially spaced from the support 32. The tabs 46 are partially offset radially outwardly with respect to the tongues 44. The tabs 46 are preferably formed substantially identical to each other. The tabs 46 collectively define the outside diameter of the mounting plate 40. Preferably, each tab 46 extends obliquely, but may alternatively extend substantially axially.

Preferably, each centering tab 46 is in the form of a portion of a cylinder. The bore in each tab 46 is radially spaced apart from the support 32 by a non-zero radial distance. The outer surfaces of the tabs 46 collectively define the outside diameter of the mounting plate 40. The tabs 46 provide the centering of the mounting plate 40 once it has been mounted in the bore 12*a* of the housing 12 of the associated electric motor 10, specifically by engaging with the inner circumferential surface (not indicated) defining the bore 12*a*.

As illustrated in FIGS. 2 and 3, the centering tabs 46 are spaced apart from one another in the circumferential direction, in this instance evenly or regularly. As an alternative, it could be possible to provide an irregular or staggered circumferential spacing of the tabs 46. Each tab 46 is positioned in the circumferential direction between two immediately successive tongues 44. Specifically, each tab 46 is spaced apart in the circumferential direction from two immediately adjacent retention tongues 44. In this case, each centering tab 46 preferably has a circumferential dimension greater than a circumferential dimension of each one of the retention tongues 44.

As stated above, the mounting plate 40 is also configured to establish and maintain an axial space or spacing between the brush 30 and the bearing 16 or the housing 12. The connecting portions 50 connecting the tabs 46 to the radial portion 42 are formed to provide this function or purpose.

Each connecting portion 50 includes an oblique portion 50*a* which extends obliquely outwardly from the radial portion 42 of the mounting plate 40 on the side of the radial portion 42 opposite to the support 32 and the tongues 44. The oblique portion 50*a* of each connecting portion 50 is offset axially with respect to the support 32 and the tongues 44 on the side opposite the radial portion 42 of the mounting plate 40. In other words, the retention tongues 44 extend axially from one side of the radial portion 42 of the mounting plate 40, and retain the support 32 against the one side of the radial portion 42, and the oblique portion 50*a* of each connection portion 50 extends axially from the opposing side of the radial portion 42 of the plate 40. Further, the oblique portion 50*a* of each connecting portion 50 extends from the large-diameter edge of the radial portion 42.

More specifically, the radial portion 42 of the mounting plate 40 has an internal face against which the support 32 is mounted, pressing axially thereagainst, and an external face axially opposite the internal face. The internal and external faces delimit the axial thickness of the radial portion 42. The oblique portion 50*a* of each connecting portion protrudes with respect to the external face of the radial portion 42.

Each connecting portion 50 is also provided with a curved part 50*b* extending from the oblique part 50*a* and connected to the associated centering tab 46. The curved part 50*b* has a rounded convex shape oriented axially outwardly, i.e. on the side opposite the support 32. The curved part 50*b* forms a bend. The small-diameter edge of the curved part 50*b* is connected to the large-diameter edge of the associated oblique part 50*a* and the large-diameter edge of the curved part 50*b* is connected to the associated centering tab 46.

Preferably, the connecting portions 50 of the mounting plate 40 are formed substantially identical to each other. Each connecting portion 50 preferably has a circumferential dimension which is equal to that of the associated centering tab 46. As an alternative, the connecting portions 50 may each have a reduced circumferential dimension in comparison with a circumferential dimension of each of the centering tabs 46.

The mounting plate 40 is preferably produced by cutting and pressing, such as in a stamping operation. Preferably, the mounting plate 40 is made from a conductive material such as aluminum, stainless steel, bronze, copper or another appropriate conductive material. Alternatively, the mounting plate 40 may be made from an electrically non-conductive material with a conductive coating or a conductive paint applied to the plate 40. In this instance, the mounting plate 40 is made as a single piece or of one-piece construction.

While the electric machine 10 is in operation, any electric charge that builds up on the shaft 14 is dissipated to the housing 12 through the conductive fibers 31, the support 32 of the brush 30, and the mounting plate 40 of the grounding brush assembly 20. Due to the connecting portions 50 of the mounting plate 40, contact between the conductive fibers 31 of the brush 30 and the bearing 16 is prevented.

In the depicted exemplary embodiment, the mounting plate 40 of the grounding brush assembly 10 includes a plurality of centering tabs 46. Alternatively, the centering tabs 46 may be replaced by an annular flange forming an annular centering portion (not shown).

With such an alternative design, the mounting plate 40 may comprise a single annular connecting portion extending over an angular sector of less than 360° or a plurality of connecting portions spaced apart from one another in the circumferential direction (neither structure shown).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers disposed at least partially within the support; and a brush mounting plate secured to the support of the brush, the mounting plate including a radial portion, at least one centering portion extending at least axially from the radial portion and offset radially outwardly with respect to the support, the centering portion having an outer surface defining the outside diameter of the mounting plate, and at least one connecting portion connecting the radial portion to the at least one centering portion and having at least one oblique part extending obliquely outwardly from the radial portion on a side of the radial portion opposite to the support;

wherein the at least one connecting portion of the mounting plate is provided with a curved part extending from the oblique part and connected to the at least one centering portion.

2. The assembly according to claim 1, wherein the at least one connecting portion of the mounting plate extends from a large-diameter edge of the radial portion of the mounting plate.

3. The assembly according to claim 2, wherein the oblique part of the at least one connecting portion of the mounting plate extends from the large-diameter edge of the radial portion of the mounting plate.

4. The assembly according to claim 1, wherein the mounting plate includes a plurality of retention tongues for retention of the support of the brush, the retention tongues extending from the radial portion, the at least one centering portion being offset radially outwardly with respect to the plurality of retention tongues.

5. The assembly according to claim 1, wherein the mounting plate is made as a single piece.

6. The assembly according to claim 1, wherein the mounting plate includes a plurality of the centering portions spaced apart from each other in the circumferential direction, and a plurality of the connecting portions, each connecting portion connecting a separate one of the plurality of the centering portions to the radial portion of the mounting plate.

7. The assembly according to claim 1, wherein the at least one centering portion of the mounting plate is an annular centering portion.

8. The assembly according to claim 1, wherein the brush is mounted axially against the radial portion of the mounting plate.

9. An electric motor comprising:

a housing;

a shaft;

at least one bearing mounted radially between the housing and the shaft; and at least one grounding brush assembly according to claim 1 mounted radially between the housing and the shaft, the conductive fibers of the brush of the grounding brush assembly being in contact with the shaft.

* * * * *